(12) United States Patent
Kim (10) Patent No.: US 7,593,719 B2
(45) Date of Patent: Sep. 22, 2009

(54) APPARATUS AND METHOD FOR CHECKING ORIGINATOR INFORMATION OF MESSAGE IN MOBILE COMMUNICATION SYSTEM

(75) Inventor: Jong-Hwan Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/043,160

(22) Filed: Jan. 27, 2005

(65) Prior Publication Data

US 2005/0170815 A1 Aug. 4, 2005

(30) Foreign Application Priority Data

Jan. 30, 2004 (KR) .................. 10-2004-0006331

(51) Int. Cl.
*H04Q 7/22* (2006.01)
(52) U.S. Cl. ................. 455/412.2; 455/412.1; 455/410
(58) Field of Classification Search ................. 455/403, 455/414.1, 412.1–413, 414.2, 415, 466, 450, 455/410, 445, 411, 452.1, 414.4–417, 432.2–433; 379/88.19, 88.2, 88.21, 93.23, 127.01, 142.01–18, 379/245, 88.12, 88.13, 88.14, 88.18, 88.22
See application file for complete search history.

(56) References Cited

U.S. PATENT DOCUMENTS

| 5,999,820 | A * | 12/1999 | Sutanto et al. ............. 455/508 |
| 6,324,271 | B1 * | 11/2001 | Sawyer et al. .......... 379/142.05 |
| 6,788,928 | B2 * | 9/2004 | Kohinata et al. ............. 455/411 |
| 6,826,403 | B1 * | 11/2004 | Minborg et al. ............. 455/445 |
| 6,853,711 | B2 * | 2/2005 | Brisebois et al. ....... 379/142.06 |
| 2002/0094806 | A1 * | 7/2002 | Kamimura .................. 455/415 |
| 2002/0119786 | A1 * | 8/2002 | Boehmke .................... 455/455 |
| 2004/0125925 | A1 * | 7/2004 | Marsot ..................... 379/88.22 |
| 2004/0218583 | A1 * | 11/2004 | Adan et al. ................. 370/352 |
| 2005/0107074 | A1 * | 5/2005 | Zellner ....................... 455/415 |
| 2005/0176409 | A1 * | 8/2005 | Carpenter ................ 455/412.1 |
| 2005/0192035 | A1 * | 9/2005 | Jiang .......................... 455/461 |
| 2005/0199728 | A1 * | 9/2005 | Schmidt et al. ........ 235/462.46 |
| 2005/0285547 | A1 * | 12/2005 | Piepgras et al. ............ 315/294 |
| 2006/0003756 | A1 * | 1/2006 | Kumaki ...................... 455/418 |
| 2007/0037569 | A1 * | 2/2007 | McNiff et al. ............ 455/422.1 |
| 2007/0293274 | A1 * | 12/2007 | Gieseke ...................... 455/566 |

FOREIGN PATENT DOCUMENTS

| JP | 6-261034 A | 9/1994 |
| JP | 9-130563 A | 5/1997 |
| JP | 10-164211 A | 6/1998 |
| JP | 11-98284 A | 4/1999 |
| JP | 2001-119739 A | 4/2001 |
| JP | 2001-350999 A | 12/2001 |

(Continued)

*Primary Examiner*—Alexander Eisen
*Assistant Examiner*—Dai A Phuong
(74) *Attorney, Agent, or Firm*—Birch, Stewart, Kolasch & Birch, LLP (57) ABSTRACT

An apparatus for checking originator information of a message in a mobile communication system includes a server for detecting originator information, such as an originator phone number, identification information and authentication state information of a received message. A mobile switching center establishes a transmission path for the text message on the basis of the detected recipient information, and transmits the text message, the detected originator phone number, the identification information and the authentication state information through the established path.

2 Claims, 5 Drawing Sheets

FOREIGN PATENT DOCUMENTS

| | | |
|---|---|---|
| JP | 2002-510179 T | 4/2002 |
| JP | 2002-232522 A | 8/2002 |
| JP | 2002-261944 | 9/2002 |
| JP | 2002-261944 A | 9/2002 |
| JP | 2003-338879 A | 11/2003 |
| JP | 2004-518385 T | 6/2004 |
| JP | 2005-218078 A | 8/2005 |
| WO | WO-99/37104 A2 | 7/1999 |
| WO | WO-02/063838 A2 | 8/2002 |

\* cited by examiner

APPARATUS AND METHOD FOR CHECKING ORIGINATOR INFORMATION OF MESSAGE IN MOBILE COMMUNICATION SYSTEM

This application claims the priority benefit of Patent Application No. 10-2004-0006331 filed on Jan. 30, 2004 in Republic of Korea, which is hereby incorporated by reference.

This application is related to Applicant's copending application Ser. No. 11/043,961, filed on Jan. 28, 2005, entitled "Message Authentication Apparatus and Method in Mobile Communication System," which is incorporated by reference herein.

BACKGROUND OF THE INVENTION

1. Field of the Invention

The present invention relates to a mobile communication system. More particularly, the present invention relates to a message authentication apparatus and method of a mobile communication system.

2. Description of the Related Art

In general, a mobile communication system allows a user to wirelessly page and be wirelessly connected for communication with another party instantly, any time and anywhere through switch controlling of an Mobile Switching Center (MSC), while the user moves in a service area served by a base station (BS).

Presently, data communication (e.g. text messaging) and multimedia communication (e.g. video clips, still pictures), as well as voice communication can occur between the user and another party.

A mobile station (MS) used for mobile communication is usually in a standby mode most of the time. In other words, the voice communication usage time or operation rate of the MS is low. Thus, in order to raise the operation rate of the MS, mobile communication service providers have developed and provided supplementary services including online games, wireless Internet connection, text message transmission and image message transmission services. In addition, the MS can perform various other functions and operations, such as phone book management, memorandum creation, message creation, schedule management, games, camera functions, electronic calculator and time alarms.

The text message transmission function, the most frequently used supplementary service, transfers a message with desired content to another party simply and accurately by using symbols, numbers, characters, figures and the like. The text message transmission function has an advantage that it occupies a transmission channel for a very short time, so a communication cost is low. Also, since a text message uses a non-real time transmission method, desired content can be accurately transferred regardless of an off-hook status of the other party.

There are many ways to send a text message such as by connecting a text terminal to a general wired phone set, connecting a computer to the Internet, and creating a text message in a mobile communication terminal (such as a cellular phone, PDA etc.). In these methods, a specific phone number of a user or an arbitrary phone number is inputted as originator information and then transmitted together with the corresponding text message. Then, an MS of a receiving side can check the received text message and the originator information.

The method for checking originator information of a message (message sender information) in a mobile communication system for a text message transmission service in accordance with the related art will now be described with reference to FIG. 1.

Figure 1:
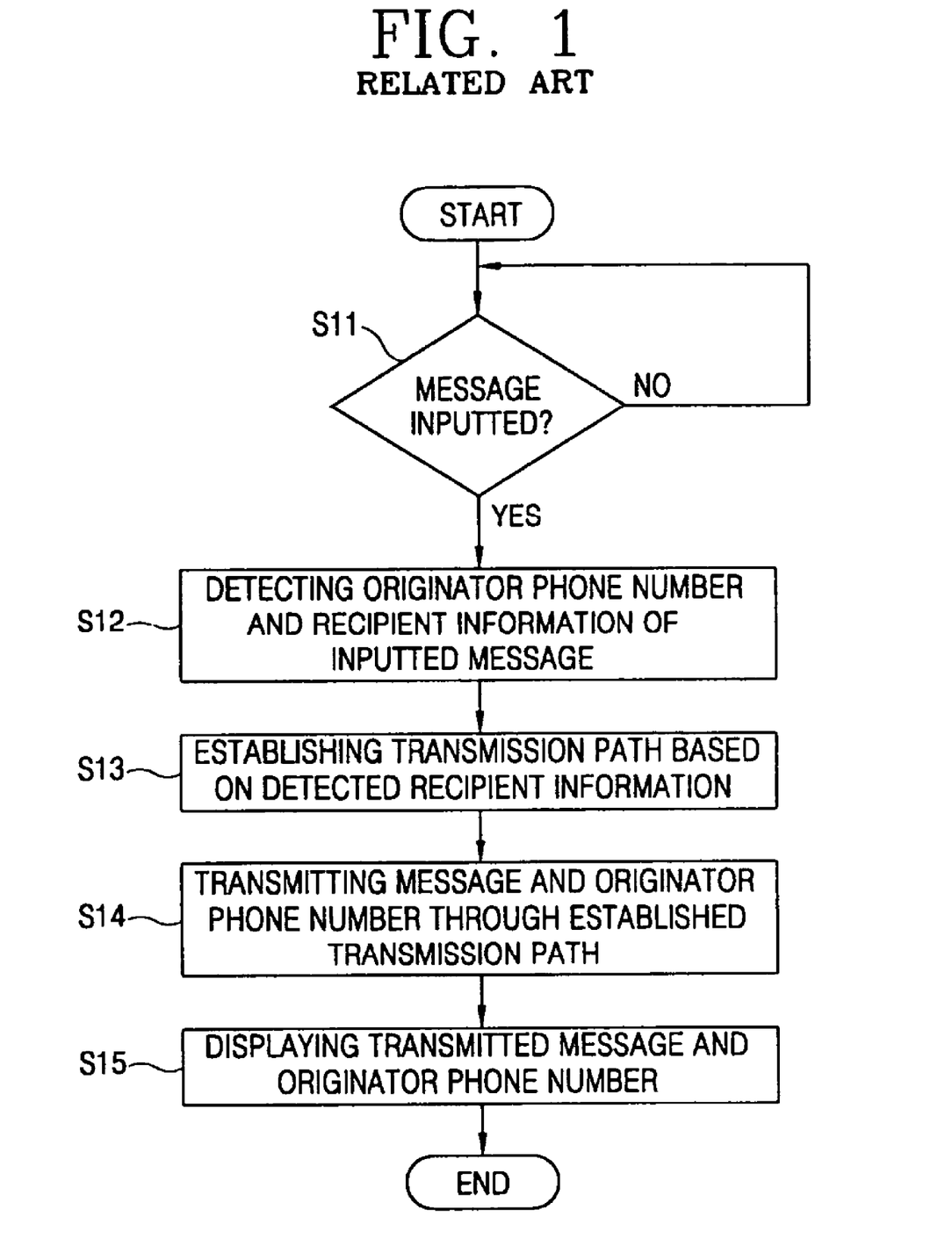
FIG. 1 is a flow chart of a method for checking originator information of a message in a mobile communication system, in accordance with the related art.

FIG. 1 is a flow chart of a message authentication method in a mobile communication system in accordance with the related art.

As shown in FIG. 1, the related art method for checking originator information of a message in a mobile communication system includes: a step in which whether a text message has been inputted is checked (step S11); a step in which when a text message has been inputted, a originator phone number of the inputted text message and recipient information are detected (step S12); a step in which a transmission path of the text message is set based on the recipient information (step S13); a step in which the text message and the detected originator phone number are transmitted through the set transmission path (step S14); and a step in which the transmitted text message and the originator phone number are displayed (step S15).

The related art method for checking originator information of a message in a mobile communication system will be described in detail as follows. First, a user creates a text message of desired content through a text message origination function of the MS. The user inputs originator information (e.g., the originator phone number), and then, transmits the text message having the originator information to a base station (BS) of a service area where the user belongs. In this case, the BS forms a specific service area for transmitting/receiving a communication signal by being wirelessly connected with the MS. A wider service area can be formed by disposing multiple BSs at certain intervals.

The BS transmits the received text message to the MSC. Then, a server checks whether the text message has been inputted to the MSC (step S11). When the text message has been inputted, the server detects the originator information and the recipient information of the text message (step S12). Then, the server transmits the detected information to the MSC, and the MSC establishes a transmission path for the text message, based on the detected recipient information (step S13).

Thereafter, the MSC transmits the text message and the detected originator information through the established transmission path to a BS where the MS of the recipient resides (step S14). The MS of the receiving side displays the text message and the originator information of the text message through a display unit (step S15).

Figure 2:
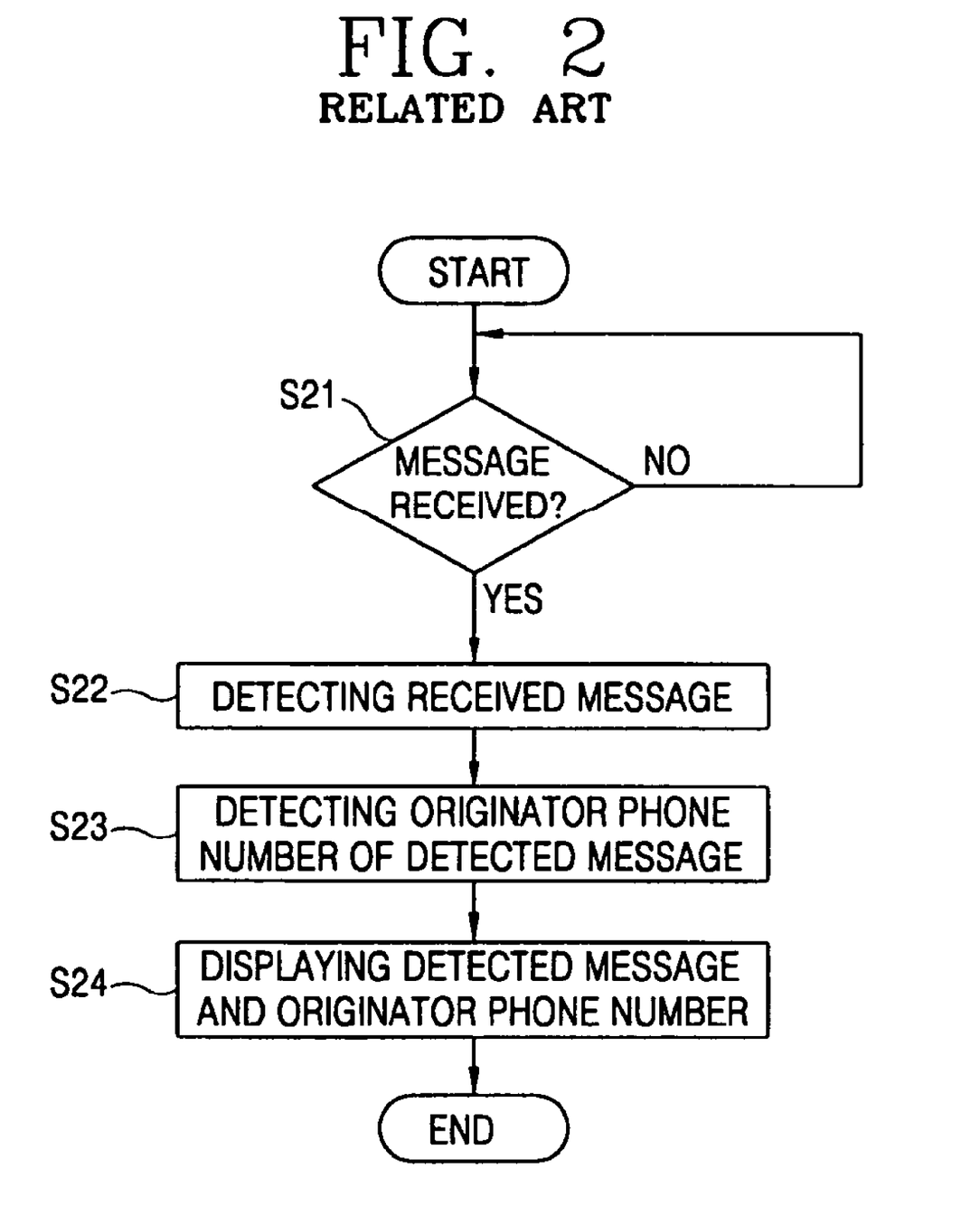
FIG. 2 is a flow chart of a method for checking originator information of a message of an MS of a receiving side, in accordance with the related art.

The step of displaying the text message and the originator information of a text message will now be described with reference to FIG. 2. FIG. 2 is a flow chart of a message authentication method at an MS of a receiving side, in accordance with the related art.

As shown in FIG. 2, the related art method for checking originator information of a message by an MS at a receiving side, includes: a step in which whether a text message has been received is checked (step S21); a step in which when a text message has been received, the text message is detected (step S22); a step in which a originator phone number of the detected text message is detected (step S23); and a step in which the detected text message and the originator phone number are displayed (step S24).

The related art method for checking originator information of a message of the MS of the receiving side will now be described in detail. First, a BS of the receiving side on the transmission path transmits the text message and the originator phone number of the text message to the MS of the receiving side. The MS of the receiving side periodically checks whether the message transmitted from the BS of the corresponding service area is inputted (step S21).

When the message is inputted, the MS of the receiving side detects the message (step S22), detects the originator phone number of the message (step S23), and displays the detected message and the detected originator phone number through a display unit, so that the receiving side can check the text message and the originator phone number of the text message (step S24).

As mentioned above, thanks to the development of various communication-related techniques, mass production and the drop in the cost of parts, the text message transmission method of the mobile communication system of the related art can transfer desired content accurately on a real time basis at a relatively low cost. However, the related art method for checking the originator information in a mobile communication system has drawbacks. Since only the originator phone number, inputted by a user, is set as originator information and transmitted together with a corresponding text message, the receiving MS cannot properly check the truth of the origination information of the received text message. In other words, the originator or sender of the text message may have supplied a false originator phone number to trick or mislead the recipient as to the source of the text, image or video message.

SUMMARY OF THE INVENTION

Therefore, one object of the present invention is to provide an apparatus and method for checking originator information of a message in a mobile communication system capable of enhancing the reliability of originator information of a received message by transmitting an originator phone number, identification information and authentication state information inputted by, or associated with a user.

To achieve these and other advantages and in accordance with the purpose of the present invention, as embodied and broadly described herein, there is provided an apparatus for checking originator information of a message in a mobile communication system including a server for detecting originator information, such as an originator phone number, identification information and authentication state information of a received message. A Mobile Switching Center (MSC) establishes a transmission path for the received message on the basis of the detected recipient information, and transmits the received message, the detected originator phone number, the identification information and the authentication state information through the established path.

To achieve the above objects, there is also provided to a method for checking originator information of a message in a mobile communication system including detecting recipient information, an originator phone number, identification information and authentication state information of a received message; establishing a transmission path for the received message on the basis of the detected recipient information; and transmitting the receiving message, the detected originator phone number, the detected identification information and the detected authentication state information through the established transmission path.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

An apparatus and method for checking originator information of a message in a mobile communication system is capable of enhancing a reliability of originator information of a received message by transmitting an originator phone number, identification information and authentication state information inputted by a user. Preferred embodiments of the present invention will now be described with reference to the accompanying drawings. The apparatus and method for checking originator information of a message in a mobile communication system, in accordance with the present invention, can be applied to a mobile communication system providing a short message service (SMS), a long message service (LMS) and a multimedia message service (MMS).

Figure 3:
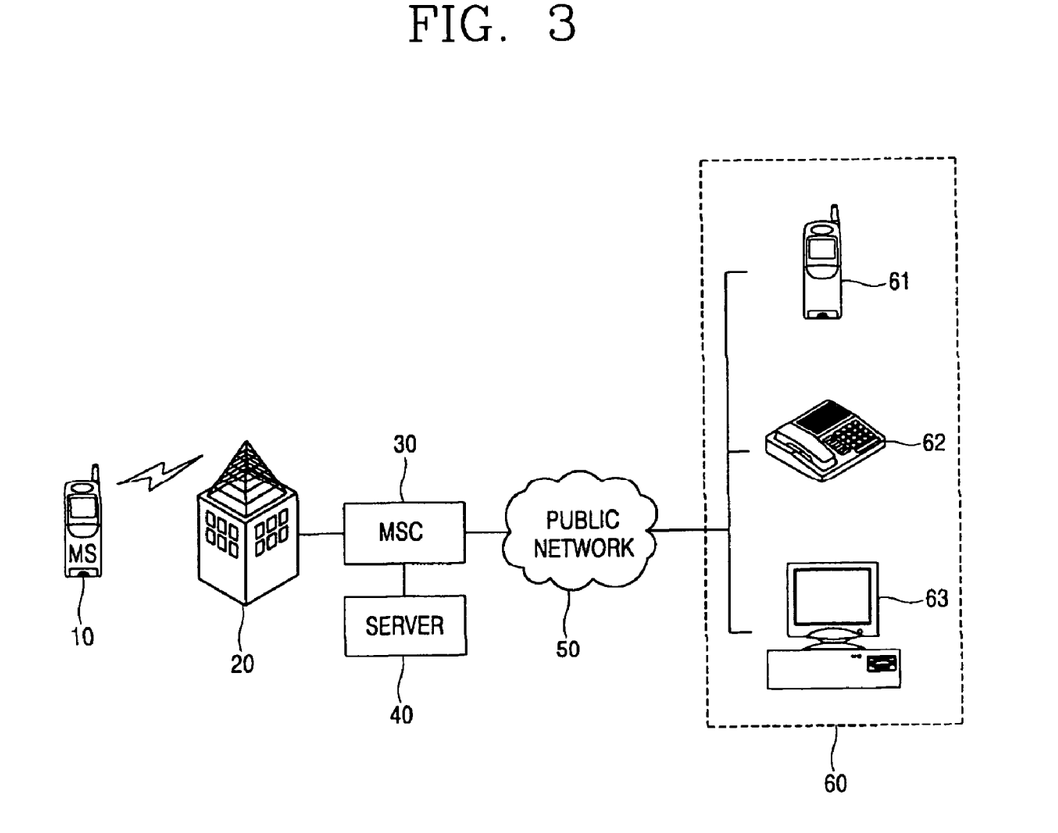
FIG. 3 shows the construction of an apparatus for checking originator information of a message in a mobile communication system, in accordance with the present invention.

FIG. 3 shows the construction of an apparatus for checking originator information of a message in a mobile communication system in accordance with the present invention. As shown in FIG. 3, the apparatus for checking originator information of a message in a mobile communication system includes an originating unit 60 for creating a message and transmitting the created text message. A server 40 detects recipient information of the originated message, an originator phone number, identification information and possibly authentication state related information, such as a security code. A Mobile Switching Center (MSC) 30 establishes a transmission path for the message according to the detected recipient information and transmits the message, the detected originator phone number, the detected identification information and the formulated authentication state information through the established transmission path. A base station (BS) 20 outputs the transmitted message, the originator phone number, the identification information and the authentication state information to a corresponding receiving side service area. A mobile station (MS) 10 in the service area, and corresponding to the recipient information, displays the outputted message, the originator phone number, the identification information and the authentication state information on a display unit, such as a liquid crystal display (LCD).

The originating unit 60 is a device for transmitting a message, such as a phone set 62 or a computer 63 connected by a fixed line to a public network 50, or the MS 61 wirelessly connected to the public network 50.

Figure 4:
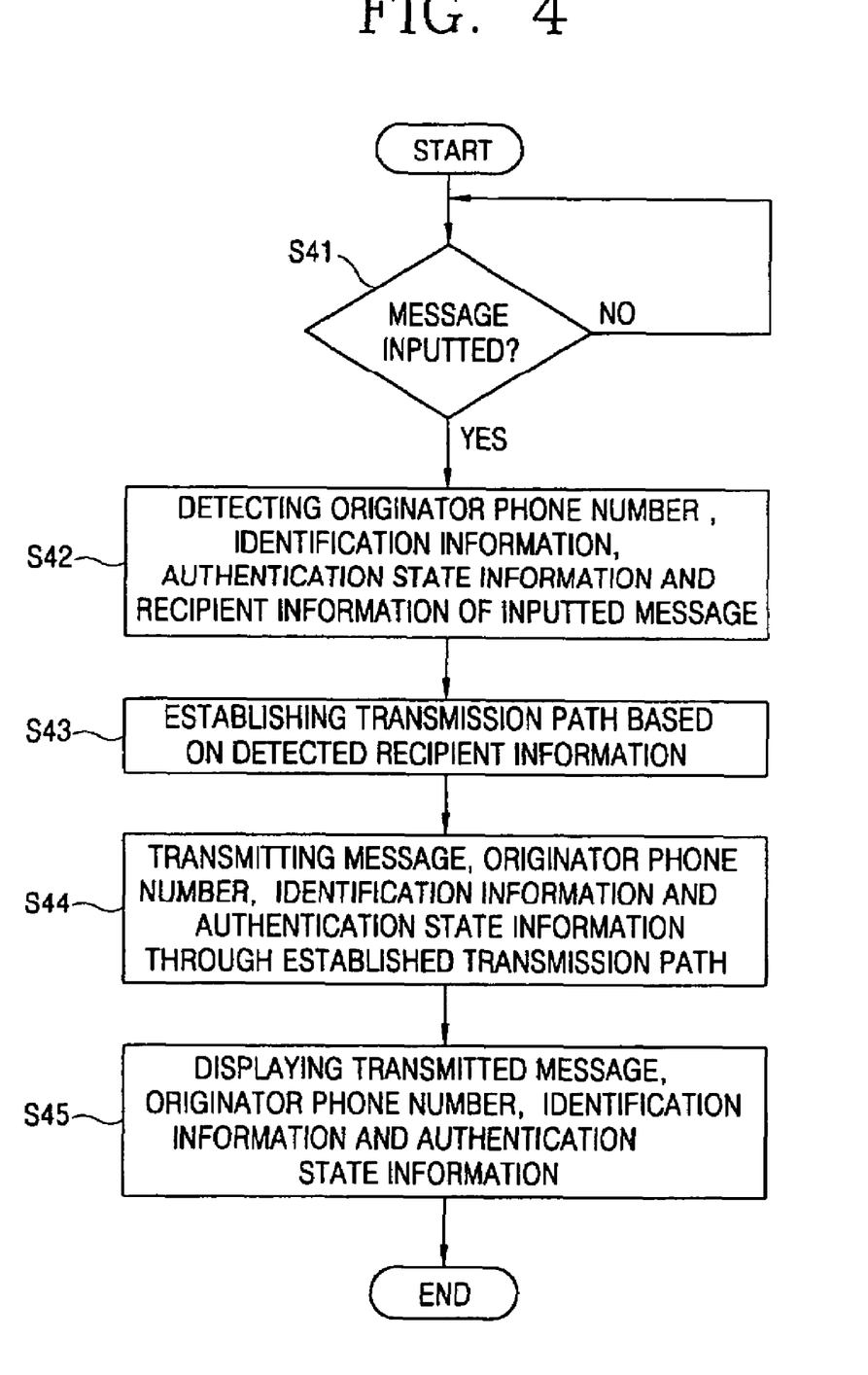
FIG. 4 is a flow chart of a method for checking originator information of a message in a mobile communication system, in accordance with the present invention.

The method for checking origination information in a mobile communication system constructed as described above, will now be described with reference to FIG. 4. FIG. 4 is a flow chart of a method for checking originator information of a message in a mobile communication system in accordance with the present invention.

As shown in FIG. 4, the method for checking originator information of a message in a mobile communication system begins with a step in which it is checked whether a message is inputted (step S41). When the message is inputted, recipient information of the message, an originator phone number, an identification information and authentication state related information (e.g. security code) are detected (step S42). Next, a transmission path for the message is established based on the detected recipient information (step S43). Next, the message and the detected originator phone number, the identification information and the formulated authentication state information are transmitted through the established transmission path (step S44). Finally, the transmitted message and the originator phone number, the identification information and the authentication state information are displayed on a display of the MS 10 (step S45).

The method for checking originator information of a message in the mobile communication system, in accordance with the present invention, will now be described in detail. First, a user creates a message (e.g. a text message, picture, video clip), and transmits it via the originating unit 60. The message could be created using the input features of the originating unit 60, or downloaded to the originating unit 60 for transmission. The originating unit 60 could be an MS 61 wirelessly connected to the MSC 30 through the public network 50, a phone set 62 and/or a computer 63 connected by a fixed line to the MSC 30 via the public network 50. Of course, a LAN or private network could be substituted for the public network 50. The MS 61 supporting wireless transmission/reception function of messages is capable of data communication with symbols, numbers and characters and multimedia communication including images and/or video clips, as well as voice communication.

The MSC 30 receives a message from the originating unit 60 and transmits the received message to the BS 20 where the MS 10 of the receiving side belongs (e.g. is within the service area). The BS 20 and MS 10 are selected according to the origination information of the received message, more specifically the recipient information. The server 40 checks whether the MSC 30 has received a message (step S41). When a message has been received, the server 40 detects recipient information of the received message, an originator phone number, identification information and authentication state related information and transmits them as origination information to the MSC 30 (step S42). The identification information indicates a type of the originating unit creating and/or transmitting the message, and authentication state information is formulated to indicate whether an originator phone number inputted by a user is a specific number which has been "normally registered" for the mobile communication system.

The term "normally registered" means that the telephone number of the originator has been recorded in a database associated with the mobile communication system. For example, a person who desires to send messages (text, image or video clips) would need to register their telephone number with the mobile communicate system. Such a registration might require the person to provide their name, address, email, and/or account number as identification data with the mobile communication system. This data would be associated with the person's telephone number in the database.

Whenever a message is to be sent, the server 40 would check the originator's telephone number and determined whether or not the person sending the message was a registered user. If so, the authentication information would indicate that the message is coming from a registered user. If not, the authentication information would indicate that the message is coming from a non-registered user.

The authentication information would provide a certain level of security to the recipient that the received message was indeed coming from the person associated with the originator's telephone number. This reduces the risk that the sender of the message has falsified their identity and sent a message to the recipient to mislead or harass the recipient. For instance, if the server 40 obtains the originator's telephone number by using a caller ID function, there is a high probability that the telephone number of the originator is true. Coupling this fact with the fact that the originator has previously registered with the mobile communication system, the source of the message is highly assured.

However, there are also instances where the caller ID function cannot be used to obtain the originator's telephone number. For instance, the originator might send a message from a computer 63 or a fixed line telephone 62 outside of an area served by caller ID. Moreover, the originator could send a message from a fixed line telephone 62 or a MS 63 belonging to another individual who is not registered. In such an instance, the originator would have the option to input their telephone number as the originator's telephone number. The input telephone number would be checked against the telephone numbers stored in the database to determine whether or not the inputted originator telephone number is registered. Hence, again there would be an increased level of security that the alleged sender of the message was the true sender, since it would be pure happenstance that an unscrupulous person would happen to randomly select a telephone number to input as the originator's telephone number, which was registered in the database of the mobile communication system.

As an additional security measure, the originator could input a security code, which would be sent to the server 40 along with the originator's phone number. The security code would be compared to a preset security stored in the database and associated with the originator's telephone number. The security code could have been assigned or selected during the registration process. More details about the security code enhancement can be found in Applicant's co-pending application, Ser. No. 11/043,961, filed on Jan. 28, 2005, entitled "MESSAGE AUTHENTICATION APPARATUS AND METHOD IN MOBILE COMMUNICATION SYSTEM."

For example, the identification information and the authentication state information can be set as shown in Table 1.

TABLE 1

| Display state | Identification information | Authentication state information |
|---|---|---|
| M (blue color) | Mobile terminal | Registered specific number |
| M (red color) | Mobile terminal | Non-registered specific number |

TABLE 1-continued

| Display state | Identification information | Authentication state information |
|---|---|---|
| I (blue color) | Internet computer | Registered specific number |
| I (red color) | Internet computer | Non-registered specific number |
| T (blue color) | Wired phone set | Registered specific number |
| T (red color) | Wired phone set | Non-registered specific number |

In Table 1, 'M' signifies mobile, 'I' signifies the Internet, and 'T' signifies telephone, in indicating the identification information. The blue color signifies a registered specific number and the red color signifies the non-registered specific number in indicating the authentication state information. Accordingly, six types of origination information are displayed at the receiving side MS 10 on the basis of the three types of identification information and two types of authentication state information. However, the present invention is not limited to the illustrated letters and colors, and more than six types of information could be transmitted and displayed.

The BS 20 forms a service area in order to be wirelessly connected to the MS 10 for communication. The BS 20 is operated under the control of the MSC 30. The MSC 30 controls, monitors and generates operation of the mobile communication system, and analyzes and switches a call connection request signal, thereby establishing a transmission path on the basis of the recipient information of the message (step S43). The transmission path includes a voice channel for transmitting a voice signal, a data channel for transmitting a data signal and a channel for transmitting operation information.

The BS 20, of the receiving side on the established transmission path, outputs the message and the origination information received from the MSC 30 to the MS 10 positioned within its service area, so that the MS 10 can display the message and the origination information on a display unit of the MS 10 (step S45).

Figure 5:
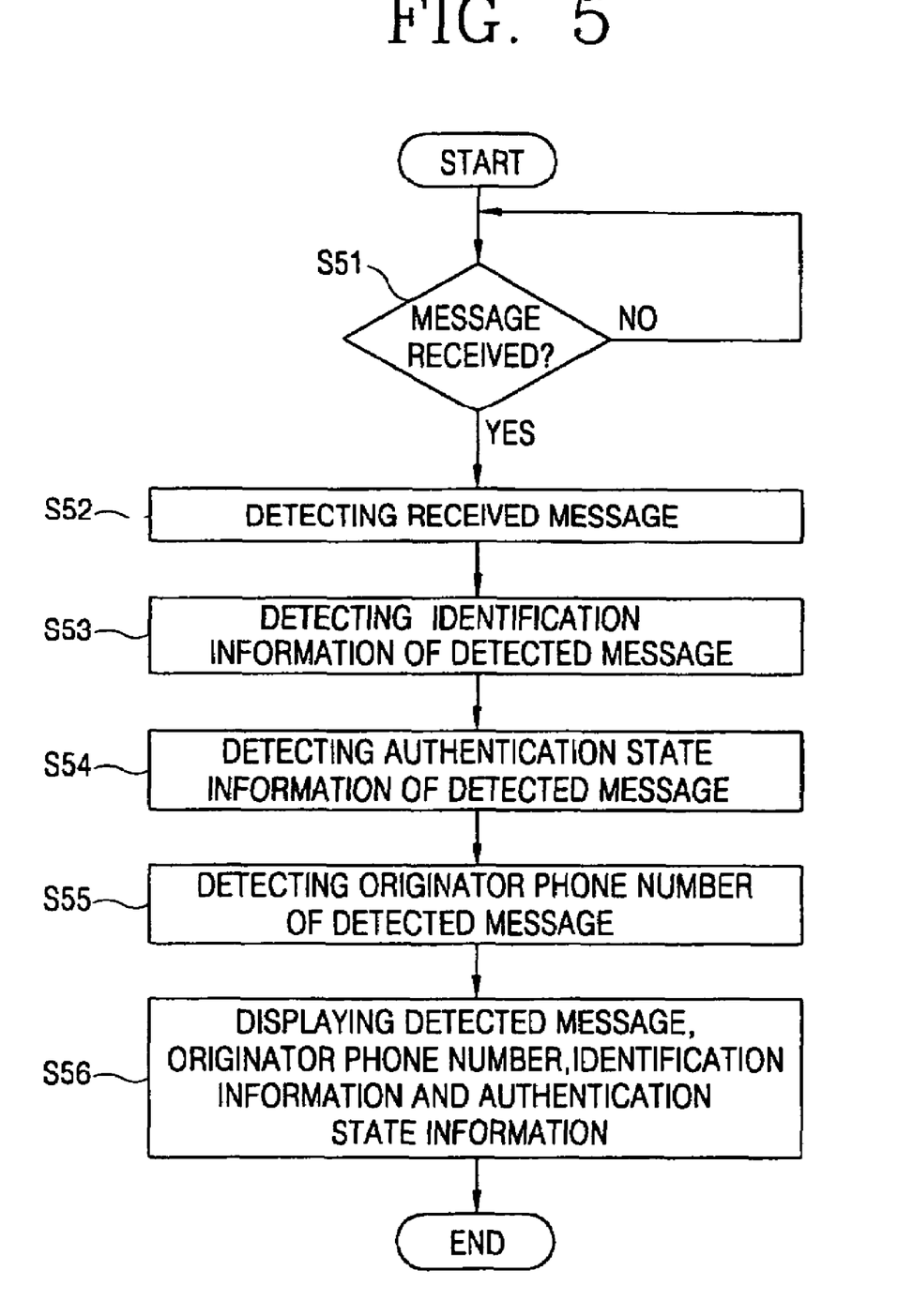
FIG. 5 is a flow chart of a method for checking originator information of a message of an MS on a receiving side, in accordance with the present invention.

A method for displaying the message and the origination information on the display unit of the MS 10 will now be described with reference to FIG. 5. FIG. 5 is a flow chart of a method for checking originator information of a message received by an MS of a receiving side, in accordance with the present invention.

As shown in FIG. 5, the method for checking origination information of a message received by an MS of a receiving side includes a step in which it is checked whether a message is received (step S51). When a message is received, the message is detected (step S52). The identification information of the message is detected (step S53). Next, the authentication state information of the message is detected (step S54). Next, an originator phone number of the message is detected (step S55). Of course, the order of steps S52, S53 and S54 could be reordered. Finally, the detected message, originator phone number, the identification information and the authentication state information are displayed (step S56).

The method for checking the origination information of the message of the MS of the receiving side will be described in detail as follows. First, the BS 20 in the transmission path transmits the message, the originator phone number of the message, the identification information and the authentication state information to the MS 10 of the receiving side. The MS 10 of the receiving side periodically checks whether a message is available to be received (step S51).

When the message is received, the MS 10 of the receiving side detects the message (step S52). And as for the origination information of the detected message, the MS 10 detects the identification information (step S53), detects the authentication state information (step S54), and, detects the originator phone number (step S55).

Thereafter, the MS 10 of the receiving side displays the detected message, the originator phone number, the identification information and the authentication state information of the message through the display unit (step S56).

Accordingly, in the apparatus for checking originator information of the mobile communication system in accordance with the present invention, the receiving side unit, e.g. MS 10 of a text message can properly check an originator of the received message via the origination information received together with the message, e.g., the originator phone number, the identification information and the authentication state information.

As described, the apparatus and method for checking origination information of a message in the mobile communication system in accordance with the present invention has several advantages. For example, since the originator phone number, the identification information and the authentication state information are transmitted together with a message the reliability that the received message actually came from the specified and displayed originator can be enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for displaying originator information of a message in a mobile communication system, the apparatus comprising:
   a mobile station including a receiver and a display unit,
   the receiver being configured to receive a message and originator information associated with the message sent by an originator device, the originator information including an originator phone number and identification information indicating a type of the originator device sending the received message,
   the display unit operatively connected to the receiver and configured to display the message, the originator phone number and the identification information,
   wherein the type is selected from a list of predetermined types comprising a mobile telephone, a networked computer and a fixed line telephone, wherein
   the receiver is configured to receive authentication state information along with the received message,
   the display unit is configured to indicate whether the originator phone number is a specific number which has been registered with the mobile communication system,
   the display unit is configured to display the authentication state information in combination with the identification information, and
   the identification information is presented on the display unit in a certain color when the originator of the message is registered, and the identification information is presented on the display unit in different color when the originator of the message is not registered.

2. A method for displaying originator information of a message in a mobile station including a receiver and a display unit of a mobile communication system, comprising:

receiving a message and originator information associated with the message sent by an originator device, the originator information including an originator phone number and identification information indicating a type of the originator device sending the received message; and displaying the message, the originator phone number and the identification information, wherein the type is selected from a list of predetermined types comprising a mobile telephone, a networked computer and a fixed line telephone, the method further comprising:

receiving authentication state information along with the received message; and displaying the authentication state information to indicate whether the originator phone number is a specific number which has been registered with the mobile communication system, wherein the authentication state information is displayed on the display unit in combination with the identification information, and the identification information is presented on the display unit in a certain color when the originator of the message is registered, and the identification information is presented on the display unit in different color when the originator of the message is not registered.

* * * * *